United States Patent
McKinnon

(10) Patent No.: US 6,802,171 B2
(45) Date of Patent: Oct. 12, 2004

(54) FRAMING MEMBER WITH FASTENER ATTACHMENTS HAVING SQUARE THREADS

(76) Inventor: Duane McKinnon, 6136 Roberts Pl., Etiwanda, CA (US) 91739

( * ) Notice: Subject to any disclaimer, the term of this patent is extended or adjusted under 35 U.S.C. 154(b) by 0 days.

(21) Appl. No.: 10/273,624

(22) Filed: Oct. 18, 2002

(65) Prior Publication Data

US 2004/0074204 A1 Apr. 22, 2004

(51) Int. Cl.[7] ............................................. E04C 3/30
(52) U.S. Cl. ..................... 52/731.4; 52/731.5; 52/780; 52/781; 52/282.2; 411/84; 411/85
(58) Field of Search ........................... 52/738, 764, 781, 52/780, 282.2, 731.7, 731.4, 731.5; 403/392, 403, 363, 233, 248; 411/437, 84, 85

(56) References Cited

U.S. PATENT DOCUMENTS

| | | | |
|---|---|---|---|
| 1,397,595 A | 11/1921 | Moyer | |
| 2,172,461 A | 9/1939 | Whitescarver | |
| 2,487,296 A | 11/1949 | Bergstrom | |
| 3,159,250 A | * 12/1964 | Wilson | 52/301 |
| 3,295,283 A | * 1/1967 | Griffith et al. | 52/481.1 |
| 3,364,807 A | 1/1968 | Holton | |
| 3,566,561 A | * 3/1971 | Tozer | 52/127.12 |
| 3,782,048 A | 1/1974 | Corman | |
| 4,281,857 A | 8/1981 | Randall | |
| 4,818,167 A | * 4/1989 | Hatsutori | 411/386 |
| 4,898,190 A | 2/1990 | Deal | |
| D328,140 S | 7/1992 | Ahlstrom et al. | |
| 5,414,967 A | 5/1995 | Cates et al. | |
| D373,832 S | 9/1996 | Nomura | |
| 5,746,535 A | * 5/1998 | Kohler | 403/258 |
| 5,837,182 A | 11/1998 | Hiroki et al. | |
| 6,016,632 A | 1/2000 | McGee et al. | |
| 6,209,275 B1 | 4/2001 | Cates et al. | |
| 6,412,240 B1 | * 7/2002 | Treleven et al. | 52/208 |

* cited by examiner

Primary Examiner—Carl D. Friedman
Assistant Examiner—Nahid Amiri

(57) ABSTRACT

A framing member has an elongate body with at least one elongate U-shaped trough. The side walls of the U-shaped trough define a plurality of elongate side wall protuberances having squared off edges. The framing member can be used with a fastener screw having squared off edges to assemble commercial and residential work benches, storage shelves, bookcases, etc.

27 Claims, 5 Drawing Sheets

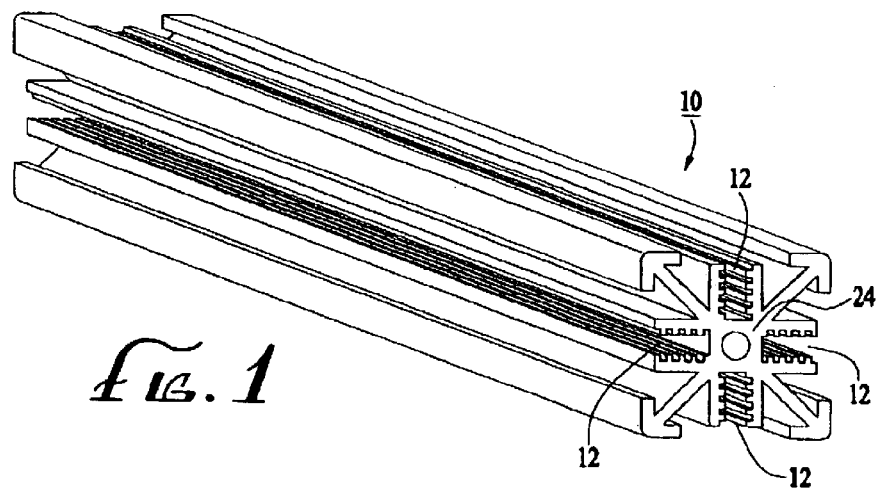
*fig.1*
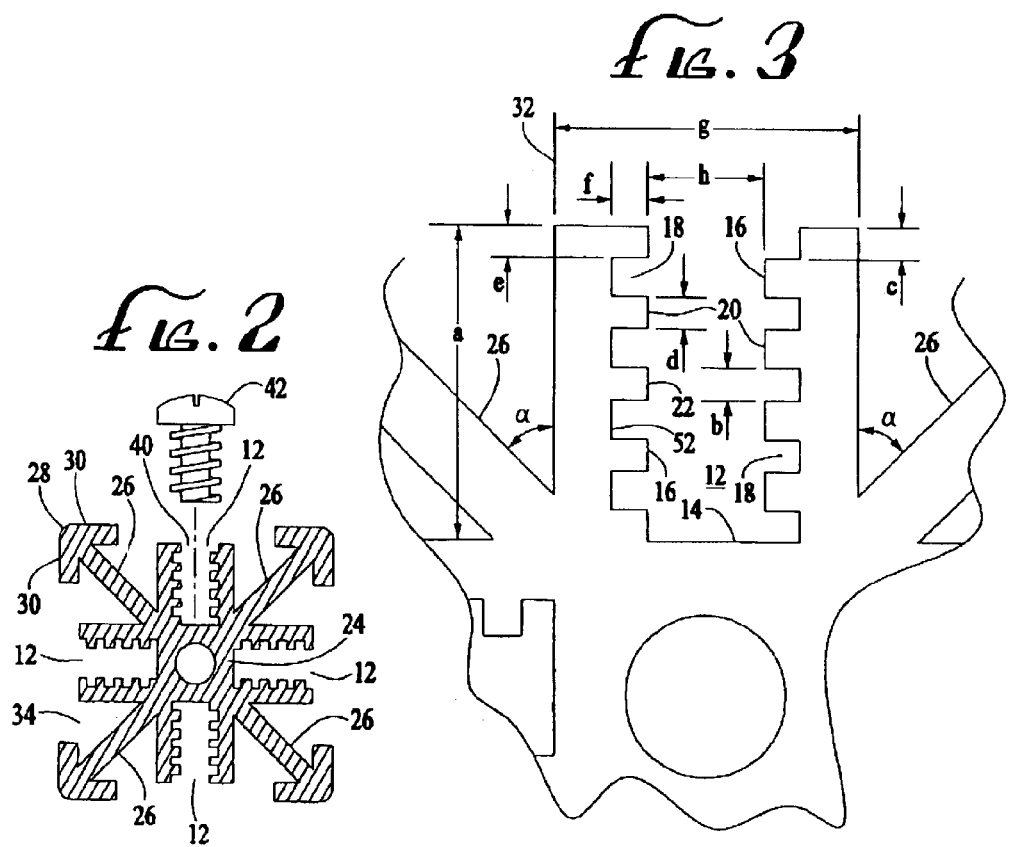
*fig.3*
*fig.2*

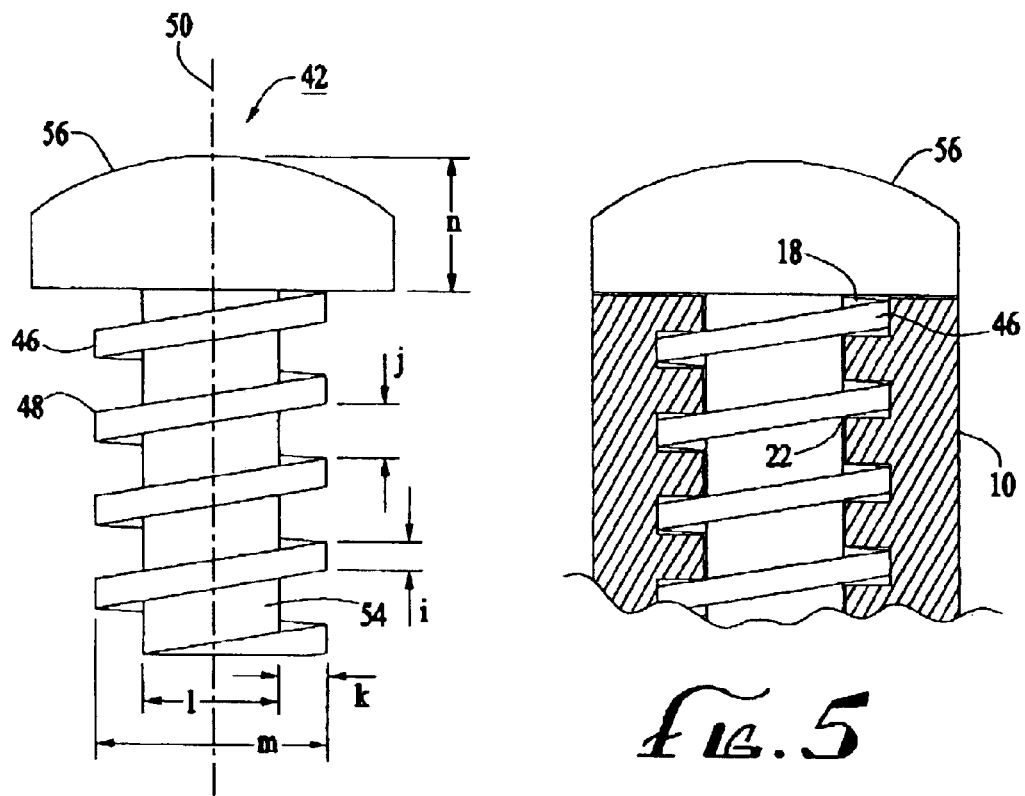
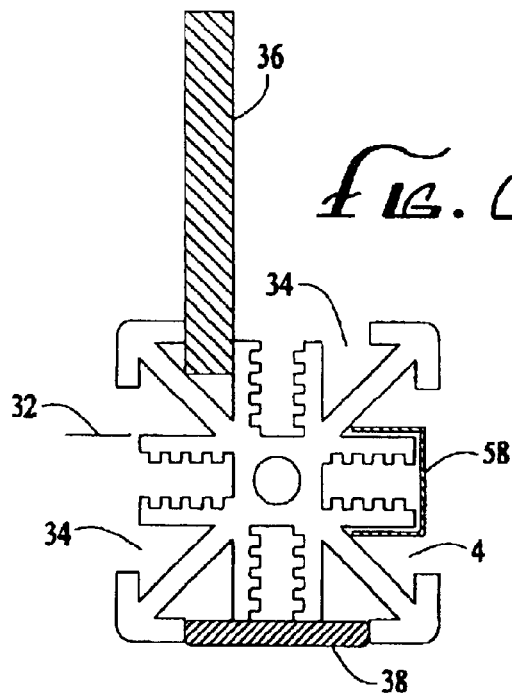

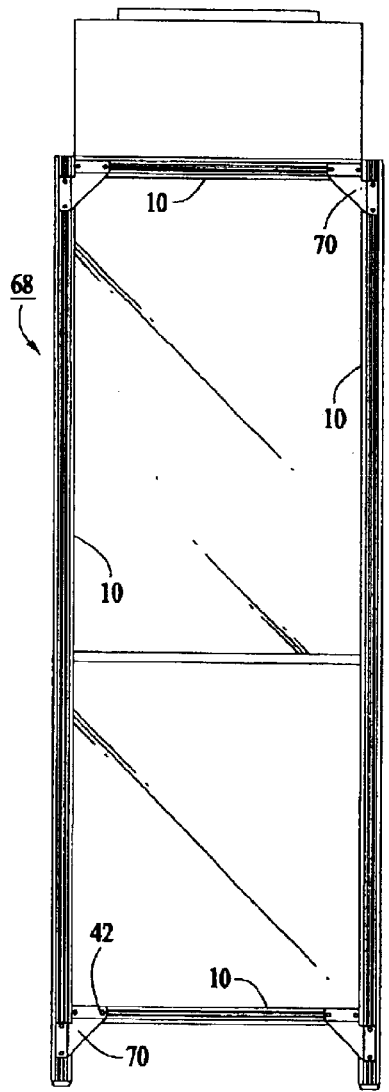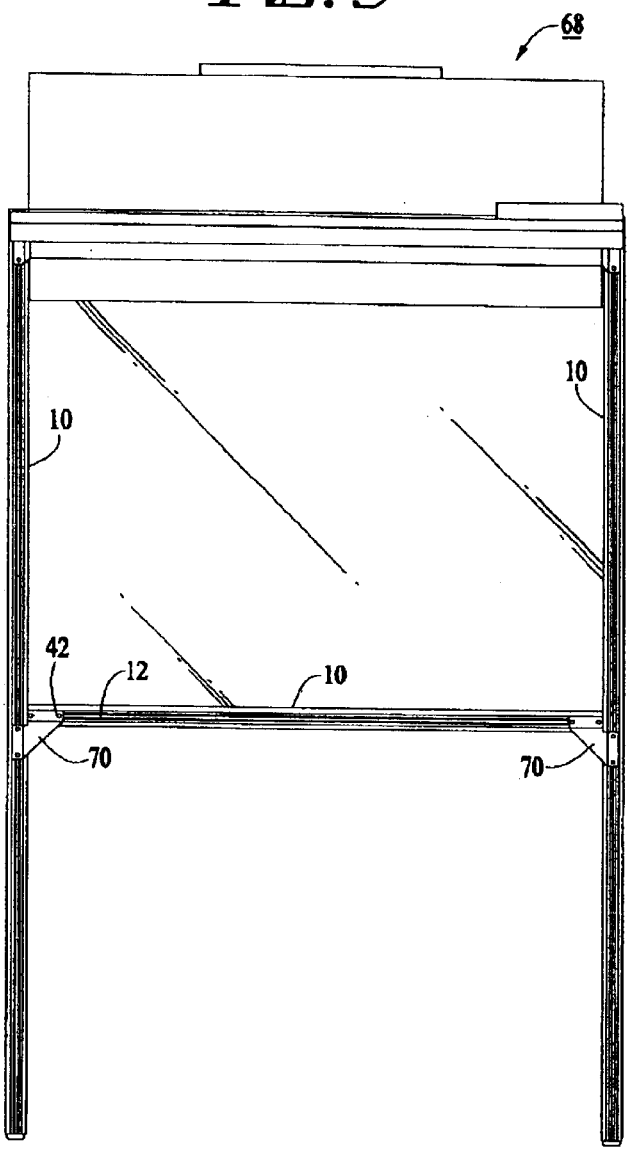

FRAMING MEMBER WITH FASTENER ATTACHMENTS HAVING SQUARE THREADS

FIELD OF THE INVENTION

This invention relates generally to framing members and, more specifically, to small, lightweight framing members which can be conveniently used to assemble work benches, storage shelves, bookcases, etc.

BACKGROUND OF THE INVENTION

Small lightweight prefabricated framing members have become increasingly popular in the construction of industrial equipment, such as tooling, machinery, conveyors and robotic enclosures. A typical such framing member is made from an aluminum alloy and has a configuration which makes it versatile in constructing fixtures and furniture. The framing member has a square cross-section. On each of the four sides of the framing member, an elongate groove is defined. The elongate groove has a pair of opposed interior shoulders. The elongate grooves are designed to accept attachment bolts. The attachment bolts are attached to attachment nuts disposed within the grooves. When each bolt is tightened, its attachment nut impinges upon the underside of the interior shoulders of the groove, thereby firmly retaining the attachment nut within the groove.

There is a problem, however, with framing members having such grooves. That problem arises from the fact that it can be very difficult to position the attachment nut within the groove and thread the attachment bolt into the attachment nut. Moreover, if the attachment nut is positioned behind a bracket or other large object, the attachment nut can be very difficult to see within the groove during the threading of the attachment bolt into the attachment nut.

Accordingly, there is a need for a lightweight framing member which avoids these problems in the prior art.

SUMMARY OF THE INVENTION

The invention satisfies this need. The invention is a framing member comprising an elongate body having at least one elongate U-shaped trough defined by a bottom wall and a pair of opposed side walls, the pair of opposed side walls both having a plurality of linear side wall grooves running continuously substantially along the entire length of the U-shaped trough, each side wall groove being defined by a plurality of side wall protuberances, a plurality of the side wall protuberances having squared off edges.

The invention is also a combination of the framing member described above and a fastener screw having threads with squared off edges.

DESCRIPTION OF THE DRAWINGS

These and other features, aspects and advantages of the present invention will become better understood with reference to the following description, appended claims and accompanying drawings where:

FIG. 1 is an isometric view of a framing member having features of the invention;

FIG. 2 is a cross-sectional view of the framing member illustrated in FIG. 1, shown in combination with a fastener screw;

FIG. 3 is a detail view of a cross-section of the attachment member illustrated in FIG. 1;

FIG. 4 is a detail view of a fastener screw having features of the invention;

FIG. 5 is a detail view showing the attachment of the attachment screw illustrated in FIG. 1;

FIG. 6 is an end view of the attachment member illustrated in FIG. 1 shown in combination with three different accessory pieces;

FIG. 8 is an end view of a first industrial cabinet constructed with the framing member illustrated in FIG. 1;

FIG. 9 is a front view of a second industrial cabinet constructed with the framing member illustrated in FIG. 1.

DETAILED DESCRIPTION

Figure 7:
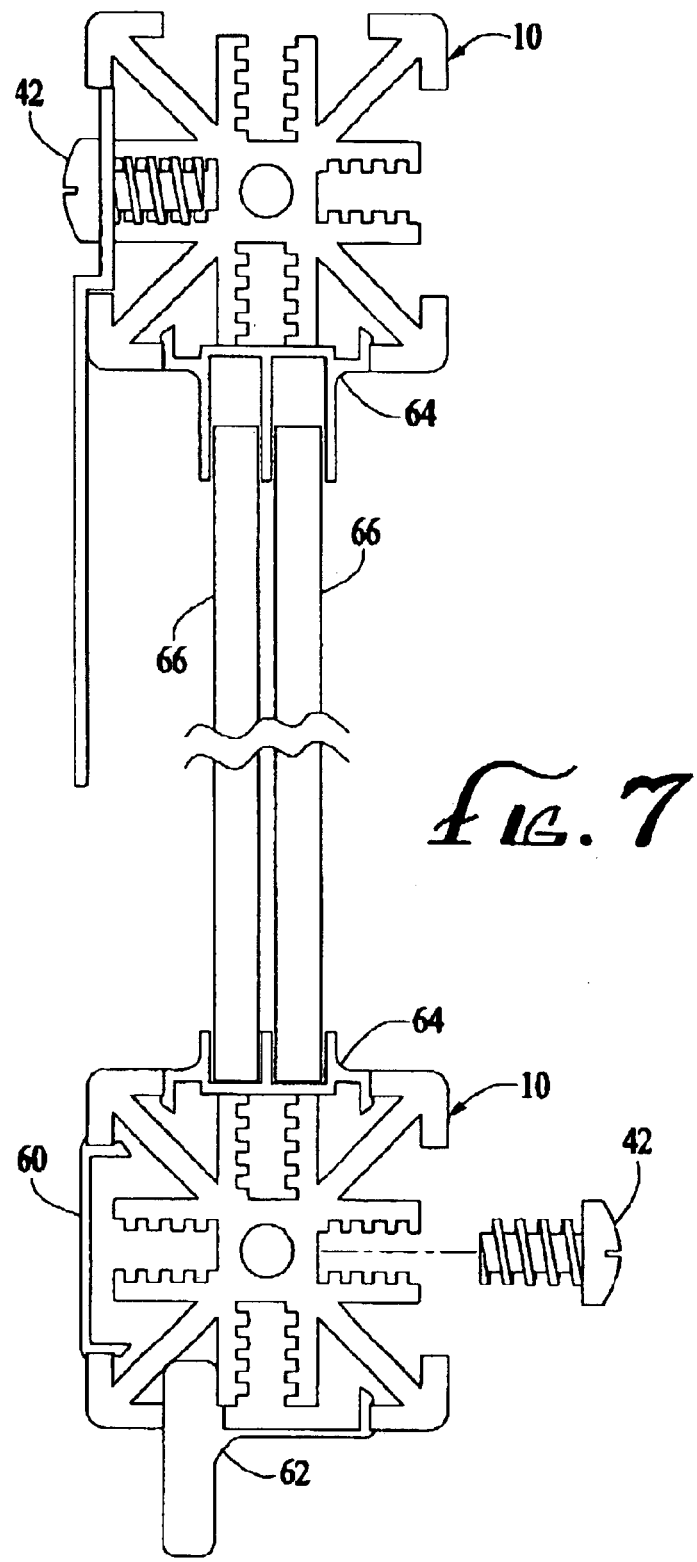
FIG. 7 is a end view of a pair of framing members, such as illustrated in FIG. 1, shown connected by a pair of sliding doors.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a framing member 10 having an elongate body with at least one U-shaped trough 12. The U-shaped trough 12 is defined by a bottom wall 14 and a pair of opposed side walls 16. The pair of side walls 16 have a plurality of opposed elongate linear side wall grooves 18 running continuously substantially along the entire length of the U-shaped trough 12. Each side wall groove 18 is defined by a plurality of elongate side wall protuberances 20. In the invention, a plurality of the side wall protuberances 20 have squared off edges 22. The term "squared off edges," when used with respect to the side wall protuberances 20, is intended to mean that the edges 22 of the side wall protuberances 20 form an angle of between about 85° and about 95°, typically about 90°.

Typically, the framing member 10 can be made from an aluminum alloy, but other materials can also be used, such as other metals and plastics.

In the embodiment illustrated in the drawing, the framing member 10 comprises a central portion 24 and four elongate U-shaped troughs 12 radially extending away from the central portion 24. Each U-shaped trough 12 is disposed 90° apart from each adjoining U-shaped trough 12. Each of the U-shaped troughs 12 has a plurality of linear side wall grooves 18 running continuously along substantially the entire length of the U-shaped trough 12. Each side wall groove 18 is defined by a plurality of side wall protuberances 20, a plurality of the side wall protuberances 20 having squared off edges 22.

Also in the embodiment illustrated in the drawings, the framing member 10 comprises four elongate diagonal plates 26. Each diagonal plate 26 extends away from the central portion 24. Each diagonal plate 26 is disposed between an adjoining pair of U-shaped troughs 12. In the embodiment illustrated in the drawings, each diagonal plate 26 is disposed apart from each adjoining U-shaped trough 12 by identical angles α of 45°. The diagonal plates 26, however, can be disposed with respect to adjoining U-shaped troughs 12 at other angles α as well.

In the embodiment illustrated in the drawings, each diagonal plate 26 has an end member 28 with two end portions 30 disposed at 90° with respect to one another, so that the end member 28 has an arrow-shaped cross-section. The two end portions 30 of the end member 28 lie in perpendicular planes which are both parallel to the side walls 16 of two of the U-shaped troughs 12. The length of each end portion 30 of the end member 28 determines the distance between each end portion 30 and a line 32 extending away from the nearest side wall 16 of a U-shaped trough 12. This distance is typically predetermined to provide a convenient attachment opening 34 for a construction sheet 36, such as a plywood or Masonite sheet, having a standard thickness which corresponds to the width of the attachment opening 34. The use of the attachment opening 34 to accept and retain a construction sheet 36 is illustrated in FIG. 6.

As also illustrated in FIG. 6, the space between opposed end portions 30 of two adjoining end members 28 can be capped by a slat 38 of corresponding width.

As illustrated in FIG. 3, the side wall protuberances 20 in each U-shaped trough 12 are staggered to form an attachment location 40 for a threaded screw 42. In a typical embodiment, wherein the height a of each U-shaped trough side wall 20 is about 0.500 inches, the distance b between the side wall protuberances 20 in each U-shaped trough 12 is typically between about 0.060 inches and about 0.070 inches, most typically about 0.065 inches, except that the depth c of the initial notch 44 on the right side of the U-shaped trough 12 in FIG. 3 is typically between about 0.0450 inches and about 0.0550 inches, most typically about 0.0500 inches. The width d of each side wall protuberance 20 in each U-shaped trough 12 is typically between about 0.04 inches and about 0.05 inches, most typically about 0.045 inches, except that the width e of the initial side wall protuberance 12i on the left side of the U-shaped trough 12 illustrated in FIG. 3 is typically between about 0.025 inches and about 0.035 inches, most typically about 0.030 inches. The length f of each side wall protuberance 20 is typically between about 0.140 inches and about 0.150 inches, most typically about 0.145 inches. The overall width g of the U-shaped trough 12 is typically between about 0.480 inches and about 0.500 inches, most typically about 0.490 inches. The distance h between the opposed side walls 16 of the U-shaped trough 12 is typically between about 0.190 inches and about 0.210 inches, most typically about 0.200 inches.

The framing member 10 is preferably used with threaded fastener screws 42 having threads 46 with squared off edges 48, as illustrated in FIG. 4. The term "squared off edges," when used with respect to the fastener screws 42, is intended to mean that the outer edges 48 of the threads 46 are disposed substantially parallel to the longitudinal axis 50 of the screw 42. Thus, the outer edges 48 of each thread 46 form angles which are approximately 90°, but are not exactly 90°.

The threads 46 of the fastener screw 42 are sized and dimensioned such that, when the fastener screw 42 is disposed within one of the U-shaped troughs 12 of the framing member 10, the threads 46 of the fastener screw 42 are disposed proximate to the base portion 52 of the side wall protuberances 20 and are disposed proximate to the squared off edges 22 of the side wall protuberances 20, but do not adversely effect the squared off edges 22 at the apex portion 53 of the side wall protuberances 20. This is illustrated in FIG. 5 where it can be seen that each of the threads 46 of the fastener screw 42 is disposed deeply within each of the grooves 18 between the side wall protuberances 20 and each of the threads 46 is disposed proximate to the squared off edges 22 of the side wall protuberances 20, but none of the threads 46 of the fastener screw 42 impinge upon the squared off edges 22 of the side wall protuberances 20 to such an extent that the side wall protuberances 20 are deformed with respect to their squared off configurations.

A typical fastener screw 42 for use with a framing member 10 comprises side walls and with a height a of about 0.500 inches is a screw 42 having threads 46 which have a thickness i which is typically between about 0.035 inches and about 0.045 inches, most typically about 0.040 inches. The threads 46 are typically spaced apart by a distance j of between about 0.0700 inches and about 0.0750 inches, most typically about 0.0725 inches. The threads 46 protrude away from the central member 54 of the fastener screw 42 by a distance k typically between about 0.0600 inches and about 0.0625 inches, most typically about 0.06125 inches. The diameter 1 of the central member 54 of the fastener screw 42 is typically between about 0.180 inches and about 0.200 inches, most typically about 0.190 inches. The diameter m of the threads 46 is typically between about 0.3000 inches and about 0.3250 inches, most typically about 0.3125 inches. The head 56 of the fastener screw 42 typically has a height n of between about 0.165 inches and about 0.1875 inches.

In most preferred embodiments, the threads 46 of the fastener screw 42 have a thickness i, a distance between adjoining threads j and j/i is between about 1.5 and about 2.0, most preferably between about 1.7, and about 1.9.

In a typical fastener screw 42 having a nominal outside diameter of 5/16 inch, the fastener screw 42 has nine threads per inch, a pitch of 0.1105 inches and a helix angle (the angle of the threads with respect to the horizontal) of 8.104°. The angle at which each thread 46 meets the central member 54 of the screw 42 is nearly 90°, typically between about 85° and about 90°, and most typically about 88°. Thus, the "flank angle" of the screw 42 is between about 0° and about 5°, typically about 2°.

In a typical embodiment, the fastener screw 42 is made from steel, although other materials, such as other metals and plastics, can also be used.

As illustrated in FIG. 6, each of the U-shaped troughs 12 can be capped by a elongate channel member 58.

As illustrated in FIG. 7, a decorative cap trim element 60 can be disposed between opposed end portions 30. Also, an optional glazing seal strip 62 can be conveniently added for clean environments. Finally, as illustrated in FIG. 7, easy to install, snap-in sliding door guides 64 can be used to retain a pair of sliding doors 66.

FIGS. 8 and 9 illustrate two different items of industrial furniture 68 capable of easily assembly using the framing member 10 of the invention. Brackets 70 are used to support the several framing members 10 using attachment screws 42 disposed within the U-shaped troughs 12.

Figure 10:
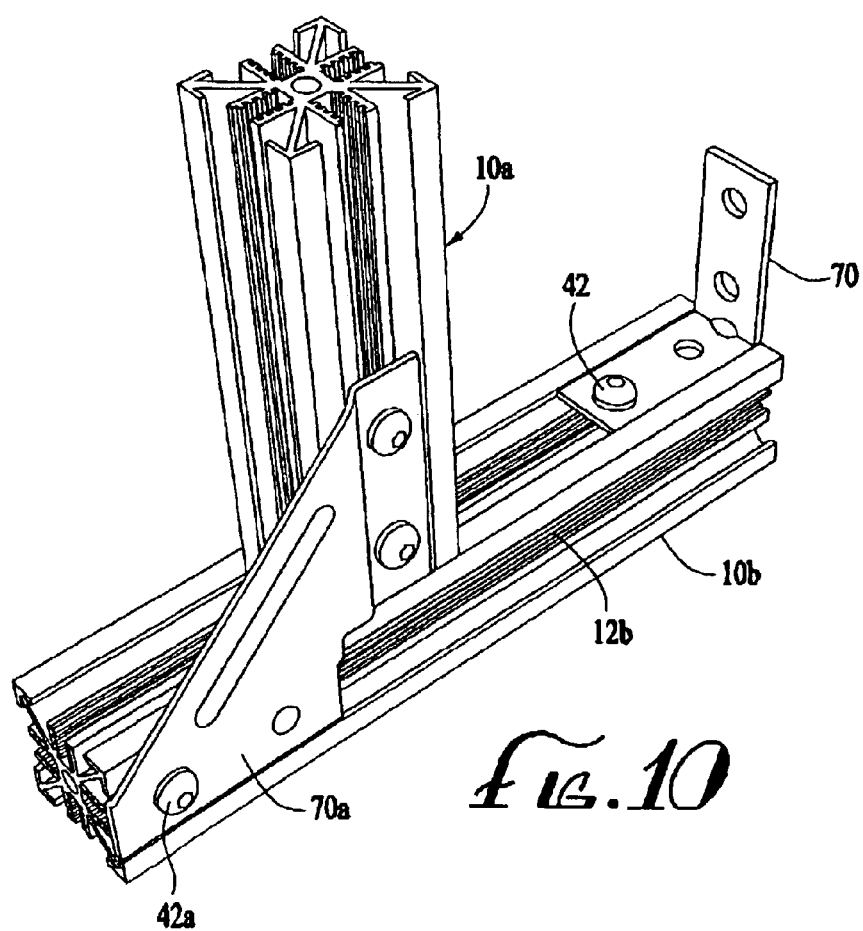
FIG. 10 is a perspective view of a pair of framing members having features of the invention.

FIG. 10 illustrates a very important feature of the invention. In the invention, once the fastener screws 42 are fully disposed within a U-shaped trough 12, but before the fastener screw 42 is finally tightened within the U-shaped trough 12, the fastener screw 42 can freely travel within the U-shaped trough 12. This is because the threads 46 of the fastener screw 42 do not rigidly contact the side wall protuberances 20 until the fastener screw 42 is finally tightened within the U-shaped trough 12. After the fastener screw 42 is fully disposed within the U-shaped trough 12, but before the fastener screw 42 is finally tightened within the U-shaped trough 12, there is sufficient clearance between the threads 46 of the fastener screw 42 and the side wall protuberances 20 to allow the fastener screw 42 to freely be slid back and forth within the U-shaped trough 12. This important feature makes it easy for the user to properly align contiguous framing members 10 with respect to one another. For example, in the embodiment illustrated in FIG. 10, the framing member 10*a* can be easily aligned with respect to the framing member 10*b* by disposing a threaded screw 42*a* into the connecting bracket 70*a* and fully disposing the fastener screw 42*a* within the U-shaped trough 12*b* of the framing member 10*b*. Then the bracket 70*a*, the fastener screw 42*a* and the framing member 10*a* can be moved back and forth with respect to framing member 10*b* until the framing member 10*a* is perfectly aligned with respect to framing member 10*b*. At that point, the alignment can be secured by finally tightening the fastener screw 42*a* within the U-shaped trough 12*b* of the framing member 10*b*.

The invention provides a framing member which is inexpensive but is versatile and durable. The framing member does away with the need to position a fastener nut within the groove disposed within the framing member. Because of the unique construction of the framing member, the framing member can be used over and over again without damage to the attachment sites within the U-shaped troughs. When used in combination with the steel screws having squared off threads and when the design and dimensions of the side wall protuberances match the threads of the attachment screws as described herein, the attachment screw does no damage to the side wall protuberances. Thus, the attachment screw can be inserted and withdrawn at the same location without damaging the framing member.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A framing member comprising an elongate body having a central portion and four elongate U-shaped troughs extending away from the central portion, wherein each U-shaped trough is defined by a bottom wall and a pair of opposed side walls, the pair of opposed side walls both having a plurality of linear side wall grooves running continuously substantially along the entire length of the U-shaped trough, each side wall groove being defined by a plurality of side wall protuberances, a plurality of the side wall protuberances having squared off edges, further comprising four elongate diagonal plates, each diagonal plate extending away from the central portion, each diagonal plate being disposed between an adjoining pair of U-shaped troughs.

2. The framing member of claim 1 wherein the framing member is made from an aluminum alloy.

3. The framing member of claim 1 wherein each U-shaped trough is disposed 90° apart from each adjoining U-shaped trough.

4. The framing member of claim 3 wherein each diagonal plate is disposed apart from each adjoining U-shaped trough by identical angles of 45°.

5. The framing member of claim 1 wherein each diagonal plate has an end member with an arrow-shaped cross-section.

6. The framing member of claim 1 wherein the side wall protuberances protrude into the U-shaped trough a distance of between about 0.55 inches and about 0.65 inches, are between about 0.04 inches and about 0.05 inches wide, and are spaced apart from adjoining side wall protuberances by between about 0.65 inches and about 0.75 inches.

7. A framing member comprising an elongate body having a central portion and four elongate U-shaped troughs extending away from the central portion, each U-shaped trough being disposed 90° apart from each adjoining U-shaped trough, each U-shaped trough being defined by a bottom wall and a pair of opposed side walls, the pair of opposed side walls both having a plurality of linear side wall grooves running continuously along substantially the entire length of the U-shaped trough, each side wall groove being defined by a plurality of side wall protuberances, each side wall protuberance having squared off edges, the framing member further comprising four elongate diagonal plates, each diagonal plate extending away from the central portion, each diagonal plate being disposed between an adjoining pair of U-shaped troughs such that each diagonal plate is disposed apart from each adjoining U-shaped trough by identical angles of 45°, each diagonal plate having an end member with an arrow shaped cross-section.

8. The framing member of claim 7 wherein the side wall protuberances protrude into the U-shaped trough a distance of between about 0.55 inches and about 0.65 inches, are between about 0.04 inches and about 0.05 inches wide, and are spaced apart from adjoining side wall protuberances by between about 0.65 inches and about 0.75 inches.

9. A combination comprising:
(a) a framing member comprising an elongate body having a central portion and four elongate U-shaped troughs extending away from the central portion, wherein each U-shaped trough is defined by a bottom wall and a pair of opposed side walls, the pair of opposed side walls both having a plurality of linear side wall grooves running continuously along substantially the entire length of the U-shaped trough, each side wall groove being defined by a plurality of side wall protuberances, a plurality of the side wall protuberances having squared off edges, further comprising four elongate diagonal plates, each diagonal plate extending away from the central portion, each diagonal plate being disposed between an adjoining pair of U-shaped troughs; and
(b) a fastener screw threadedly disposed within the elongate trough, the fastener screw having threads with squared off edges.

10. The combination of claim 9 wherein the framing member is made from an aluminum alloy and the fastener screw is made from a steel.

11. The combination of claim 9 wherein the side wall protuberances have a base portion and an apex portion and wherein the threads of the fastener screw are disposed proximate to the base portion of the side wall protuberances and do not adversely affect the squared off edges of the side wall protuberances.

12. The combination of claim 9 wherein the threads of the fastener screw have a thickness i, the distance between the threads is j and j/i is between about 1.5 and 2.0.

13. The combination of claim 12 wherein j/i is between about 1.7 and 1.9.

14. The combination of claim 9 wherein the thickness of the threads on the fastener screw is between about 0.35 and about 0.45 and wherein the distance between the threads on the fastener screw is between about 0.6 and about 0.8.

15. A combination comprising:
(a) a framing member comprising an elongate body having a central portion having four elongate U-shaped troughs extending away from the central portion, each U-shaped trough being disposed 90° apart from each adjoining U-shaped trough, each U-shaped trough being defined by a bottom wall and a pair of opposed side walls, each pair of opposed side walls both having a plurality of linear side wall grooves running continuously along substantially the entire length of the U-shaped trough, each side wall groove being defined by a plurality of side wall protuberances, each side wall protuberance having squared off, edges, the framing member further comprising four elongate diagonal plates, each diagonal plate extending away from the central portion, each diagonal plate being disposed between an adjoining pair of U-shaped troughs such that each diagonal plate is disposed apart from each adjoining U-shaped trough by identical angles of 45°, each diagonal plate having an end member with an arrow shaped cross-section; and (b) a fastener screw threadedly disposed within the elongate trough, the fastener screw having threads with squared off edges.

16. The combination of claim 15 wherein the framing member is made from an aluminum alloy and the fastener screw is made from a steel.

17. The combination of claim 15 wherein the side wall protuberances have a base portion and an apex portion and wherein the threads of the fastener screw are disposed proximate to the base portion of the side wall protuberances and do not adversely affect the squared off edges of the side wall protuberances.

18. The framing member of claim 15 wherein the side wall protuberances protrude into the U-shaped trough a distance between about 0.55 inches and about 0.65 inches, are between about 0.04 inches and about 0.05 inches wide, and are spaced apart from adjoining side wall protuberances by between about 0.65 inches and about 0.75 inches.

19. The combination of claim 15 wherein the threads of the fastener screw have a thickness i, the distance between the threads is j and j/i is between about 1.5 and 2.0.

20. The combination of claim 15 wherein the threads of the fastener screw have a thickness i, the distance between the threads is j and j/i is between about 1.7 and 1.9.

21. The combination of claim 15 wherein the thickness of the threads on the fastener screw is between about 0.35 and about 0.45 and wherein the distance between the threads on the fastener screw is between about 0.6 and about 0.8.

22. A framing member comprising:

(a) an elongate body comprising a central portion;

(b) four elongate U-shaped troughs extending away from said central portion, wherein each U-shaped trough is defined by a bottom wall and a pair of opposed side walls, the pair of opposed side walls both having a plurality of linear side wall grooves running continuously substantially along the entire length of the U-shaped trough, each side wall groove being defined by a plurality of side wall protuberances; and (c) four elongate diagonal plates, wherein each diagonal plate extends away from said central portion and is disposed between an adjoining pair of U-shaped troughs, each of said diagonal plates further comprising an end member having a surface parallel to a side wall of one of said adjoining pair of U-shaped troughs.

23. The framing member of claim 22, further comprising a construction sheet retained between said end member and said side wall of one of said adjoining pair of U-shaped troughs.

24. The framing member of claim 23, wherein said construction sheet is made from plywood or masonite.

25. A framing member comprising:

(a) an elongate body comprising a central portion;

(b) an elongate U-shaped trough extending away from said central portion, wherein said U-shaped trough is defined by a bottom wall and a pair of opposed side walls, the pair of opposed side walls both having a plurality of linear side wall grooves running continuously substantially along the entire length of the U-shaped trough, each side wall groove being defined by a plurality of side wall protuberances; and (c) an end member disposed away from said central portion and having a surface facing said U-shaped trough which is parallel to a side wall of said U-shaped trough.

26. The framing member of claim 25, further comprising a construction sheet retained between said end member and said side wall of one of said adjoining pair of U-shaped troughs.

27. The framing member of claim 26, wherein said construction sheet is made from plywood or masonite.

* * * * *